(12) United States Patent
Børresen et al.

(10) Patent No.: US 10,001,575 B2
(45) Date of Patent: Jun. 19, 2018

(54) SEISMIC DATA ACQUISITION SYSTEM WITH SELECTIVELY ENABLED SENSOR UNITS, AND ASSOCIATED METHODS

(75) Inventors: Claes Nicolai Børresen, Katy, TX (US); Stig Rune Lennart Tenghamn, Katy, TX (US)

(73) Assignee: PGS Geophysical AS, Oslo (NO)

( * ) Notice: Subject to any disclaimer, the term of this patent is extended or adjusted under 35 U.S.C. 154(b) by 1081 days.

(21) Appl. No.: 12/803,503

(22) Filed: Jun. 29, 2010

(65) Prior Publication Data
US 2011/0317517 A1     Dec. 29, 2011

(51) Int. Cl.
*G01V 1/38*     (2006.01)

(52) U.S. Cl.
CPC ................... *G01V 1/3808* (2013.01)

(58) Field of Classification Search
CPC .................................... G01V 1/3808
USPC ............................... 367/21, 76–79
See application file for complete search history.

(56) References Cited

U.S. PATENT DOCUMENTS

| | | | | |
|---|---|---|---|---|
| 3,806,864 | A | * | 4/1974 | Broding et al. ............... 367/77 |
| 3,916,371 | A | * | 10/1975 | Broding ....................... 367/78 |
| 4,117,448 | A | * | 9/1978 | Siems .......................... 367/79 |
| 4,301,521 | A | * | 11/1981 | Kelm ........................... 367/78 |
| 4,967,400 | A | * | 10/1990 | Woods .......................... 367/21 |
| 5,253,219 | A | * | 10/1993 | Houston et al. ............... 367/79 |
| 5,359,575 | A | * | 10/1994 | Williams et al. ............. 367/127 |
| 5,745,436 | A | | 4/1998 | Bittleston |
| 5,930,731 | A | | 7/1999 | Brzostowski |
| 6,477,111 | B1 | | 11/2002 | Lunde et al. |

(Continued)

FOREIGN PATENT DOCUMENTS

EP          289172 A2 *  11/1988  ............. G01F 23/00

OTHER PUBLICATIONS

Wen Tang, Jianwei Ma, Felix J. Herrmann, (2008), "Optimized Compressed Sensing for Curvelet-Based Seismic Data Reconstruction", Institute of Seismic Exploration, School of Aerospace, Tsinghua University, Beijing, China, Seismic Laboratory for Imaging and Modeling, Department of Earth and Ocean Sciences, University of British Columbia, Vancouver, Canada, pp. 1-28.

(Continued)

*Primary Examiner* — Ian J Lobo
(74) *Attorney, Agent, or Firm* — Patterson & Sheridan, LLP

(57) ABSTRACT

A disclosed seismic survey system includes one or more streamer(s) each having multiple spaced apart sensor units, and a data recording and control system. Each sensor unit receives a command from the data recording and control system, and operates in an enabled state or a disabled state dependent upon the command. The data recording and control system collects and stores data from enabled sensor units. The sensor units produce data when in the enabled state, and dissipate significantly less electrical power in the disabled state. A described sensor unit includes one or more sensor(s), an analog-to-digital converter, and a control unit that enables or disables the analog-to-digital converter dependent upon the command. A disclosed method for acquiring seismic survey data includes issuing an enable or disable command to each of multiple spaced apart sensor units, and receiving and storing data from those sensor units that are enabled.

15 Claims, 5 Drawing Sheets

(56) References Cited

U.S. PATENT DOCUMENTS

| | | |
|---|---|---|
| 6,614,724 B2 | 9/2003 | Behrens et al. |
| 7,298,672 B1 | 11/2007 | Tenghamn et al. |
| 7,382,690 B2 * | 6/2008 | Nemeth ............. 367/178 |
| 7,583,560 B2 | 9/2009 | Chamberlain et al. |
| 7,623,414 B2 * | 11/2009 | Boergen et al. ........ 367/178 |
| 8,135,543 B2 * | 3/2012 | Pavel et al. ............ 702/14 |
| 2007/0195648 A1 | 8/2007 | Borgen et al. |
| 2008/0028099 A1 * | 1/2008 | M.P. et al. ............ 709/238 |
| 2010/0039897 A1 | 2/2010 | Beasley |

OTHER PUBLICATIONS

French Preliminary Search Report for Application No. 11 55797 dated Jun. 21, 2017.

* cited by examiner

SEISMIC DATA ACQUISITION SYSTEM WITH SELECTIVELY ENABLED SENSOR UNITS, AND ASSOCIATED METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Marine seismic surveys usually employ seismic sensors below the water's surface, e.g., in the form of long cables or "streamers" towed behind a ship, or cables resting on the ocean floor. A typical streamer includes multiple seismic sensors positioned at spaced intervals along its length. Several streamers are often positioned in parallel over a survey region.

An underwater seismic wave source, such as an air gun, produces pressure waves that travel through the water and into the underlying earth. When such waves encounter changes in acoustic impedance (e.g., at boundaries or layers between strata), some of the wave energy is reflected. The seismic sensors in the streamer(s) detect the seismic reflections and produce output signals. The sensor output signals are recorded, and later interpreted to infer structure of, fluid content of, and/or composition of rock formations in the earth's subsurface.

Traditional data acquisition has been driven by the Shannon-Nyquist sampling theorem that, in essence, a continuous signal cannot be reconstructed from its samples unless the sampling rate is at least twice the signal's maximum frequency. (This theorem applies to both time sampling and spatial sampling.) "Compressed sensing", also called "compressive sampling", relaxes the strictures of the Shannon-Nyquist theorem, either by recognizing and exploiting structure in the sampled signals that reduces their information content, or by allowing some information loss to occur during the sampling process (i.e., "lossy" sampling). In effect, the compressed sensing technique combines a sampling operation with a compression operation in a manner that enables sparse sampling, advantageously reducing the volume of acquired and recorded sample data. A subsequent operation can be employed to reconstruct traditional signal samples and/or the analog signals. Such processing can be performed offline, e.g., in an environment having more time and resources for data processing and storage.

Data acquisition using compressed sensing techniques is akin to lossy data compression, so there is a tradeoff between a total number of sensors employed and the quality of the resultant survey data. For signals with low information density, like seismic signals, this tradeoff is worthwhile. In the recent paper "Optimized Compressed Sensing for Curvelet-based Seismic Data Reconstruction" by Wen Tang, Jianwei Ma, and Felix J. Herrmann, available at http://dsp.rice.edu/sites/dsp.rice.edu/files/cs/OPCRSI3.pdf and incorporated herein by reference in its entirety, the authors propose an under-sampling scheme that favors sparsity-promoting recovery. The Tang paper teaches, among other things, that seismic survey data can be acquired using substantially fewer sensors, albeit sensors carefully placed at predetermined locations. The locations can be determined in a number of ways, ranging from a random scattering to a closed-form solution derived from the expected spatial frequency content of the signals. The Tang paper provides a good compromise between expediency and performance using an "optimized" random solution.

Conventional marine seismic streamers can often be 12 kilometers (km) long, and may include hundreds, or even thousands of seismic sensors. The sheer scale of this array creates reliability concerns which are typically addressed by building the streamers out of similar, interchangeable streamer sections. If there is a problem with one of the streamer sections, the problematic streamer section is replaced by a similar streamer section. In addition, streamer sections are much easier to handle and store than whole streamers. The prior art fails to suggest a streamer for compressed sampling that can adequately address such reliability concerns.

SUMMARY

The problems outlined above are at least in part addressed by a seismic data acquisition system with closely-spaced, selectively enabled sensor units, and associated methods for operating the data acquisition system. A disclosed seismic survey system includes one or more streamer(s) and a data recording and control system. Each of the streamer(s) includes multiple spaced apart sensor units. Each of the sensor units is adapted to receive a command, and to operate in an enabled state or a disabled state dependent upon the command. The data recording and control system issues commands to enable or disable selected sensor units, collects data from enabled sensor units, and stores the data.

In some embodiments, the sensor units produce data when in the enabled state, and do not produce data when in the disabled state. The sensor units may dissipate significantly less electrical power in the disabled state than in the enabled state. The data recording and control system may generate a configuration table for the sensor units that specifies an enabled/disabled condition for each of the sensor units, and may issue the commands based on the configuration table. The sensor units may be uniformly spaced along the streamer. The enabled sensor units, on the other hand, need not be uniformly spaced. The seismic survey system may include a ship that tows the one or more streamer through a body of water.

A described sensor unit for use in a seismic sensing array includes one or more sensor(s), an analog-to-digital converter, and a control unit. Each of the sensor(s) is adapted to produce an analog output signal indicative of seismic wave energy. The analog-to-digital converter is coupled to receive the analog output signal produced by the sensor(s), and adapted to periodically sample the analog output signal, and to produce a digital data output indicative of the sampled analog output signal. The control unit is coupled to the analog-to-digital converter, and adapted to receive a command, and to enable or disable the analog-to-digital converter dependent upon the command. The enabling or disabling is independent of other sensor units in the seismic sensing array. The seismic sensing array may include one or more towed marine seismic streamers.

The analog-to-digital converter may be disabled by stopping a clock signal, or in response to an enable signal. The control unit may be adapted to produce an enable signal dependent upon the command. The analog-to-digital converter may be coupled to receive the enable signal, and adapted to sample the analog output signal produced by the one or more sensor and to produce the digital data output dependent upon the enable signal. The control unit may be adapted to provide electrical power to the analog-to-digital converter dependent upon the command. The one or more sensor(s) may include a hydrophone and/or a 3-axis accelerometer.

A disclosed method for acquiring seismic survey data includes issuing an enable or disable command to each of multiple spaced apart sensor units. A seismic shot is triggered, and data from those sensor units that are enabled is received and stored. The issuing of the enable or disable command may include determining an arrangement of enabled sensor units that would support compressed sensing, and the issued commands may create this arrangement.

The sensor units may be arranged to span a two-dimensional area, and may dissipate substantially more electrical power in the enabled state than in the disabled state. The command may include one or more binary digit(s) that specify whether a receiving sensor unit is to be placed in the enabled state or the disabled state. Each of the sensor units may have a unique address, and the issuing of the command to each of the sensor units may be carried out using the addresses of the sensor units.

The method for acquiring seismic survey data may also include generating a configuration table for the sensor units that specifies an enabled/disabled condition for each of the sensor units. The method may also include using the configuration table to issue the command to each of the sensor units. The configuration table may be generated by determining the number of desired active sensors and randomly selecting those sensors from the pool of available sensors.

Each of the sensor units may include a control unit coupled to an analog-to-digital converter. The control unit may be adapted to receive the command, and to either enable or disable the analog-to-digital converter in response to the command. The storing of the data may involve storing the data on a non-volatile medium.

BRIEF DESCRIPTION OF THE DRAWINGS

A better understanding of the various disclosed embodiments can be obtained when the detailed description is considered in conjunction with the following drawings, in which.

Figure 1:
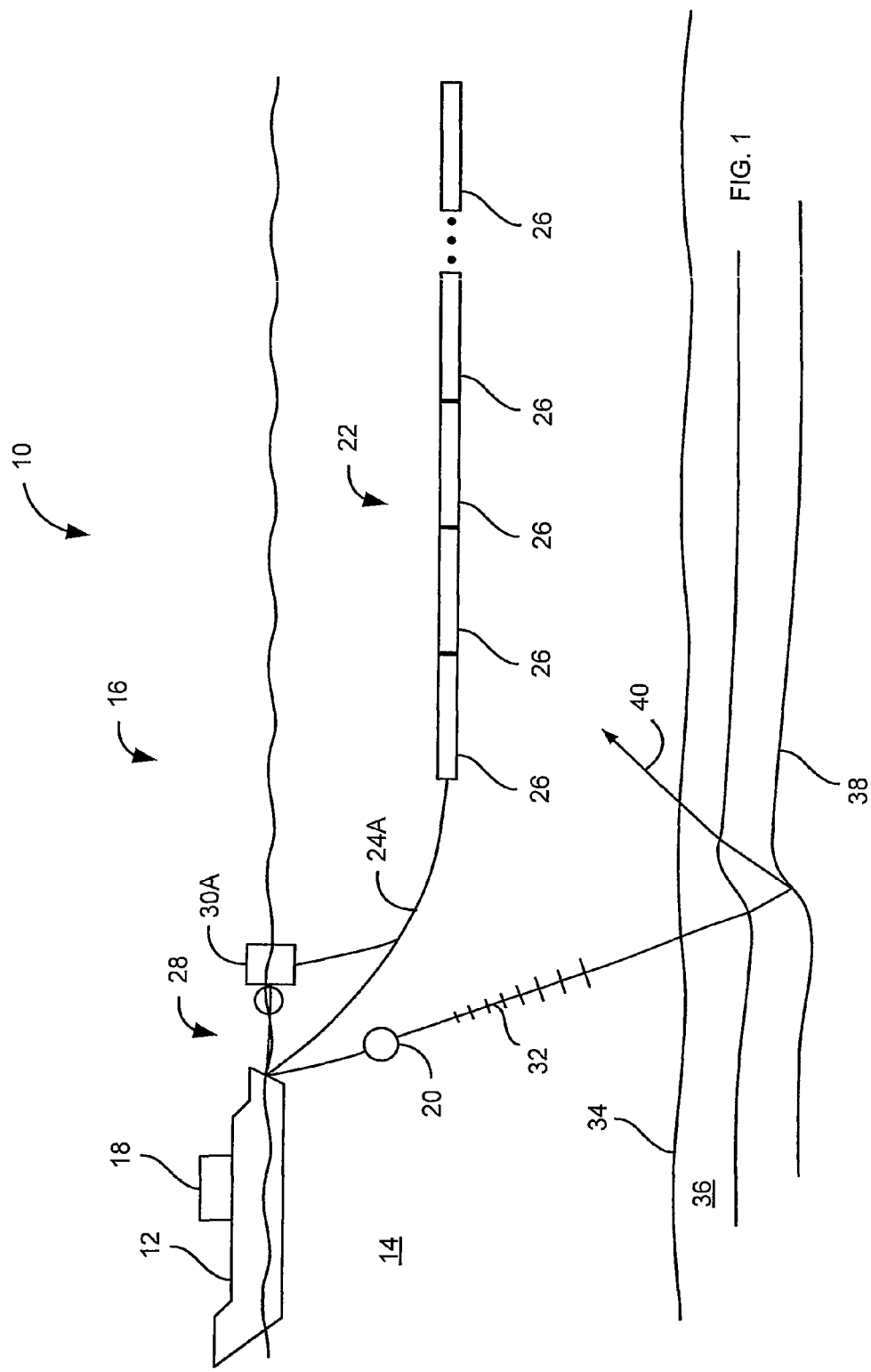
FIG. 1 is a side elevation view of an illustrative marine seismic survey system performing a marine seismic survey, where the marine seismic survey system includes multiple streamers.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the appended claims.

DETAILED DESCRIPTION

Turning now to the figures, FIG. 1 is a side elevation view of an illustrative marine seismic survey system 10 performing a marine seismic survey. A survey vessel or ship 12 is moving along the surface of a body of water 14, such as a lake or an ocean. A data acquisition system 16 of the survey system 10 includes a data recording and control system 18 aboard the ship 12. The data acquisition system 16 also includes a seismic source 20 and a sensor array 22 towed through the water 14 by the ship 12.

As described in more detail below, the sensor array 22 includes multiple spaced apart sensor units. Each sensor unit includes one or more sensors that detect seismic signals and produce output signals indicative of the seismic signals. The sensor units of the sensor array 22 are selectively enabled via commands issued by the data recording and control system 18 to achieve an arrangement of enabled sensor units that spans a two-dimensional area and supports compressed sensing. The data recording and control system 18 collects and stores data from enabled sensor units.

Figure 2:
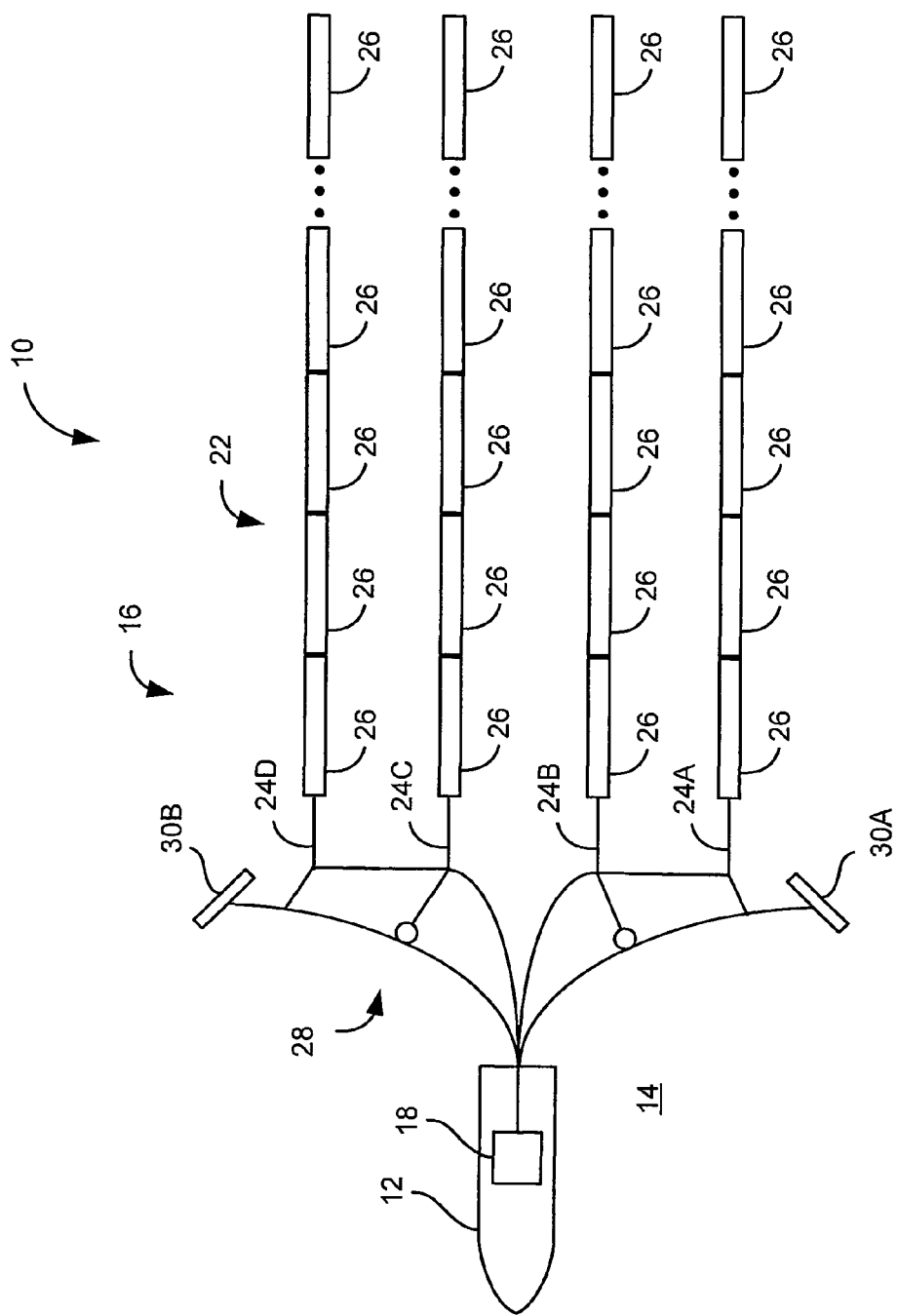
FIG. 2 is a top plan view of the marine seismic survey system of FIG. 1.

FIG. 2 is a top plan view of the marine seismic survey system 10 of FIG. 1. Referring to FIGS. 1 and 2, the multiple spaced apart sensor units of the sensor array 22 are housed in multiple sensor cables or streamers 24A-24D. Each of the streamers 24A-24D includes multiple streamer sections 26 connected end to end. Each of the streamer sections 26 includes multiple sensor units. The streamers 24A-24D are towed via a harness 28 that produces a desired arrangement of the streamers 24A-24D. The harness 28 includes multiple interconnected cables, and a pair of controllable paravanes 30A and 30B connected to opposite sides of the harness 28. As the ship 12 tows the harness 28 through the water 14, the paravanes 30A and 30B pull the sides of the harness 28 in opposite directions, transverse to a direction of travel of the ship 12. Electrical conductors and/or fiber optic cables connect the sensor units in the streamer sections 26 of the streamers 24A-24D to the data recording and control system 18 aboard the ship 12.

Referring back to FIG. 1, the seismic source 20 produces acoustic waves 32 under the control of the data recording and control system 18, e.g., at regular intervals or at selected locations. The seismic source 20 may be or include, for example, an air gun. The acoustic waves 32 travel through the water 14 and into a subsurface 36 below a bottom surface 34. When the acoustic waves 32 encounter changes in acoustic impedance (e.g., at boundaries or layers between strata), some of the wave energy is reflected. In FIG. 1, ray 40 represents wave energy reflected in a particular direction from interface 38.

As described in more detail below, enabled sensor units of the sensor array 22, housed in the streamer sections 26 of the streamers 24A-24D, detect these seismic reflections and produce output signals. The output signals produced by the enabled sensor units are recorded by the data recording and control system 18 aboard the ship 12. The recorded signals are later interpreted to infer structure of, fluid content of, and/or composition of rock formations in the subsurface 36.

There are often many thousands of detectors in a given sensor array 22. A modular construction, e.g., with substantially identical and interchangeable sections 26, greatly simplifies handling, maintenance, and repair. However, compressed sensing employs an irregular layout of detectors. It would be impractical to build customized streamer sections that would need to be assembled in a particular order and would not be interchangeable. In the embodiment of FIGS. 1 and 2, the streamer sections 26 of the streamers 24A-24D are substantially identical and interchangeable. If there is a problem develops with one of the streamer sections 26, the problematic streamer section 26 can be replaced by any other spare streamer section 26.

Figure 3:
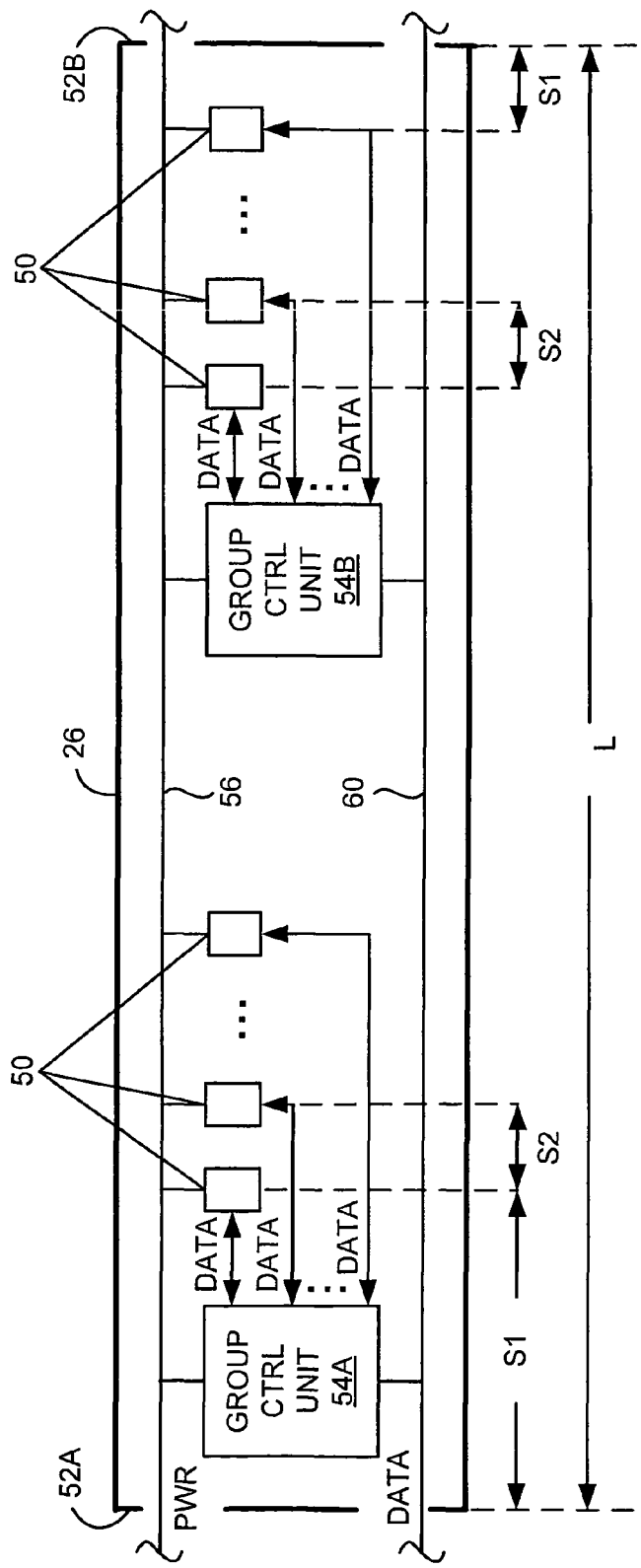
FIG. 3 is a diagram of an illustrative streamer section.

FIG. 3 is a diagram of an illustrative streamer section 26 from FIGS. 1 and 2. In the embodiment of FIG. 3, the streamer section 26 includes multiple spaced apart sensor units 50, where each of the sensor units 50 includes at least one seismic sensor as described in more detail below. The streamer section 26 is substantially cylindrical, and has two opposed ends 52A and 52B. The streamer section 26 has a length L typically between 50 meters and 100 meters. Each of the ends 52A and 52B has one or more connectors for conveying electrical power and data signals between sections. The sensor units 50 are spaced apart by a distance S2 in the range between 0.3 meters and 3.0 meters. The distance from the ends 52A, 52B to the nearest sensor unit 50 is S1, which is about half of S2. (FIG. 3 is not drawn to scale.)

In the embodiment of FIG. 3, the sensor units 50 are arranged in groups of N sensor units, where N is expected to be in the range between 4 and 64, but is not limited to this range. The sensor units 50 in each group are connected to a common group control unit. Two such groups are shown in FIG. 3, where a first sensor unit group is connected to a group control unit 54A, and a second sensor unit group is connected to a group control unit 54B. Each group control unit receives data signals from the sensor units in the corresponding group, and produces a single output data stream that conveys the data from that group. The group control units may employ data compression and multiplexing techniques to generate the output data stream from the sensor data signals.

In the embodiment of FIG. 3, a power distribution bus 56 spans the length of the streamer section 26 between the connectors at the ends 52A and 52B, and a data bus 60 spans the length of the streamer section 26 between the connectors at the ends 52A and 52B. Each of the group control units (including the group control units 54A and 54B) is coupled to the data bus 60, and the data bus 60 is used to convey the output data streams produced by the group control units out of the streamer section 26. The data bus 60 is also used to convey output data streams produced by other group control units within other streamer sections connected to the end 52B. In some embodiments, the group control units employ a standard network communications protocol to send data packets to the data recording and control system 18.

The streamer sections 26 are often subject to wear and damage during transport, deployment, and use. Accordingly, the power distribution bus 56 and the data bus 60 of FIG. 3, may include two or more buses, each capable of performing the intended function (e.g., dual redundant buses). The multiple buses may be located close to one another for increased convenience (at the cost of reduced survivability), or separated from one another for increased survivability (at the cost of reduced convenience). The streamer sections 26 also include a jacket covering an exterior of the streamer sections 26, and one or more strength members extending along the length of the streamer sections 26 inside the jacket. Suitable streamer section construction techniques are described in U.S. Pat. No. 7,298,672 granted to Tenghamn et al., incorporated herein by reference in its entirety.

In conventional seismic streamers, numbers and physical sizes of electrical and/or fiber optic cables servicing sensors, and power supply voltage safety constraints, often limit a number of the sensors that can be located in streamer sections. However, in the marine seismic survey system 10 of FIGS. 1 and 2, a majority of the sensor units 50 of the sensor array 22 are expectedly disabled by the data recording and control system 18 to achieve a programmable arrangement of enabled sensor units 50 that spans a two-dimensional area and supports compressed sensing. For example, in some arrangements of the sensor array 22, only about 25 percent of the sensor units 50 would be enabled. This factor enables significantly more sensor units 50 to be positioned in the streamer sections 26 of FIG. 3 and consequently allows the spacing distances S1 and S2 to be reduced.

Figure 4:
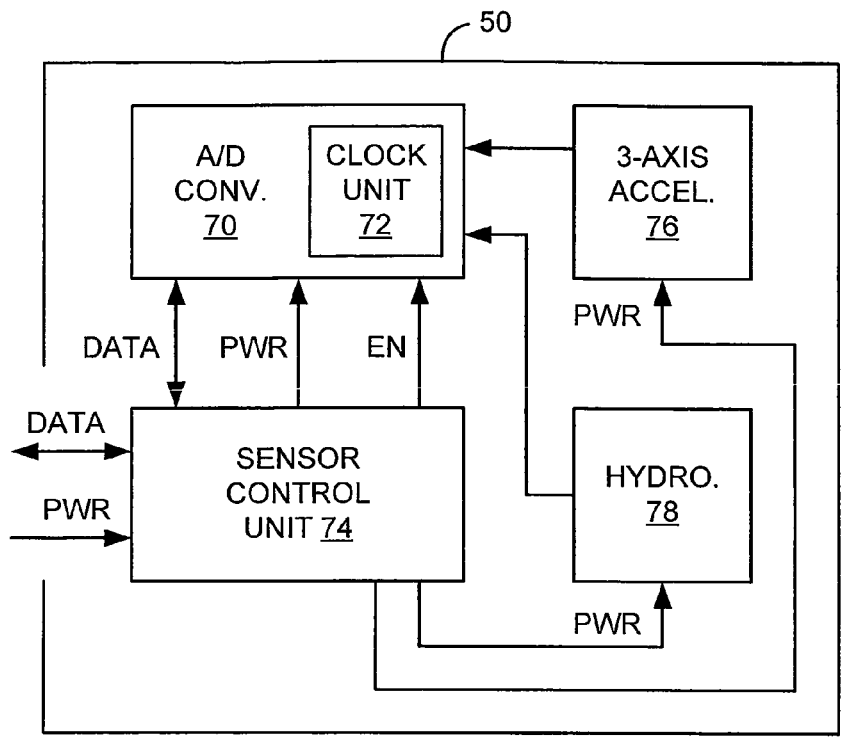
FIG. 4 is a diagram of an illustrative sensor unit.

FIG. 4 is a diagram of a representative sensor unit 50. In the embodiment of FIG. 4, the sensor unit 50 includes an analog-to-digital converter 70 coupled to a hydrophone 78, a 3-axis accelerometer 76, and a sensor control unit 74. (Some embodiments omit the analog-to-digital converter 70, enabling the digitization to be performed at the group control unit.) During operation, the analog-to-digital converter 70 receives analog output signals produced by the hydrophone 78 and the 3-axis accelerometer 76, and periodically samples the analog output signals to produce digital data output signals indicative of the sampled analog output signals. The analog-to-digital converter 70 provides the digital data output signals to the sensor control unit 74, and the sensor control unit communicates the data to the data recording and control system 18.

Sensor unit 50 is adapted to receive commands from the data recording and control system 18, and to operate in an enabled state or a disabled state dependent upon those commands. The sensor unit 50 collects data when in the enabled state, and does not collect data when in the disabled state. The sensor unit 50 dissipates substantially less electrical power in the disabled state than in the enabled state.

In the embodiment of FIG. 4, the sensor control unit 74 receives the commands, and responsively enables or disables the analog-to-digital converter 70. For example, the analog-to-digital converter 70 may include a clock unit 72 that governs the operation of the analog-to-digital converter 70. When an enable signal 'EN' is asserted, the clock unit 72 runs, thereby producing an oscillating clock signal and enabling the analog-to-digital converter 70 to operate. When the enable signal is de-asserted, the clock unit 72 halts, thereby holding the clock signal in stasis and disabling operation of the analog-to-digital converter. When the sensor control unit 74 receives an enable command, the sensor control unit 74 may assert the enable signal EN. When, on the other hand, the sensor control unit 74 receives a disable command, the sensor control unit 74 may deassert the enable signal EN, thereby effectively stopping the clock signal and disabling the analog-to-digital converter 70.

In the embodiment of FIG. 4, the sensor control unit 74 receives electrical power (e.g., from the power bus 56 of FIG. 3) via a line labeled 'PWR,' and distributes electrical power to the analog-to-digital converter 70, the hydrophone 78, and the 3-axis accelerometer 76 via lines labeled 'PWR.' In some embodiments, the sensor control unit 74 is adapted to control the redistribution of power dependent upon the commands received from the data recording and control system 18. For example, when the sensor control unit 74 receives an enable command, the sensor control unit 74 may provide electrical power to the analog-to-digital converter 70, the hydrophone 78, and/or the 3-axis accelerometer 76. When, on the other hand, the sensor control unit 74 receives a disable command, the sensor control unit 74 can switch off the electrical power to the analog-to-digital converter 70, the hydrophone 78, and/or the 3-axis accelerometer 76.

Figure 5:
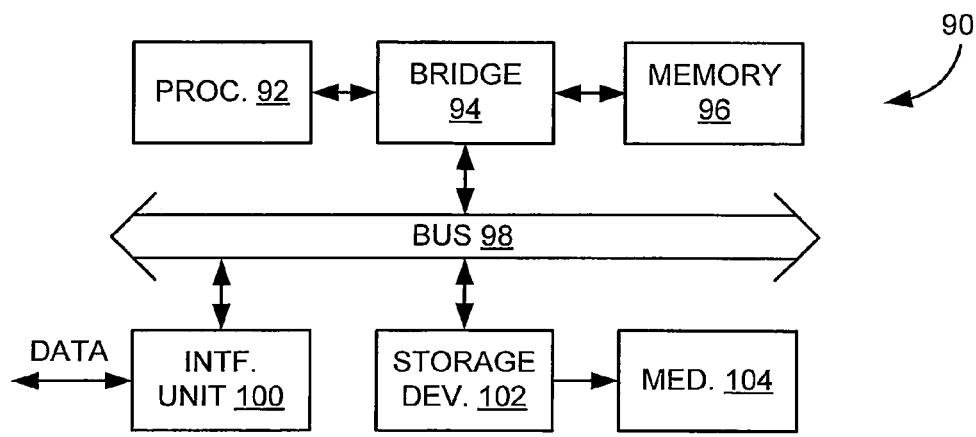
FIG. 5 is a diagram of an illustrative data recording and control system.

FIG. 5 is a diagram of one embodiment of a computer system 90 capable of carrying out some or all of the functions of the data recording and control system 18. In the embodiment of FIG. 5, the computer system 90 includes one or more processor(s) 92, a bridge 94, a memory 96, a bus 98, an interface unit 100, a storage device 102, and a storage medium 104. The bridge 94 is connected to the processor(s) 92, the memory 96, and the bus 98. The bridge 94 handles communication between the processor(s) 92 and the memory 96, the interface unit 100, and the storage device 102, and between the memory 96 and the interface unit 100 and the storage device 102.

The interface unit 100 conveys data to and from the computer system 90, thereby enabling the processor(s) 92 to communicate commands to various components of the sensor array 22 and to receive data from the sensor array. The command and data signals may be, for example, electrical signals conveying digital data, or optical signals conveying digital data. Among the various commands sent via the interface unit are the commands that the processor(s) 92 use to enable or disable selected sensor units 50.

The storage device 102 is adapted to send information to, and receive information from, the information storage medium 104. Various contemplated storage devices include a magnetic or optical disk drive device or storage array, or a port such as a universal serial bus (USB) port. The storage medium 104 may be, for example, a nonvolatile memory device such as a magnetic disk, an optical disk such as a Compact Disc Read Only Memory (CD-ROM) disk or a Digital Versatile Disc (DVD) disk, a flash memory device such as a USB flash drive, or a portable hard drive.

Figures 6, 7:
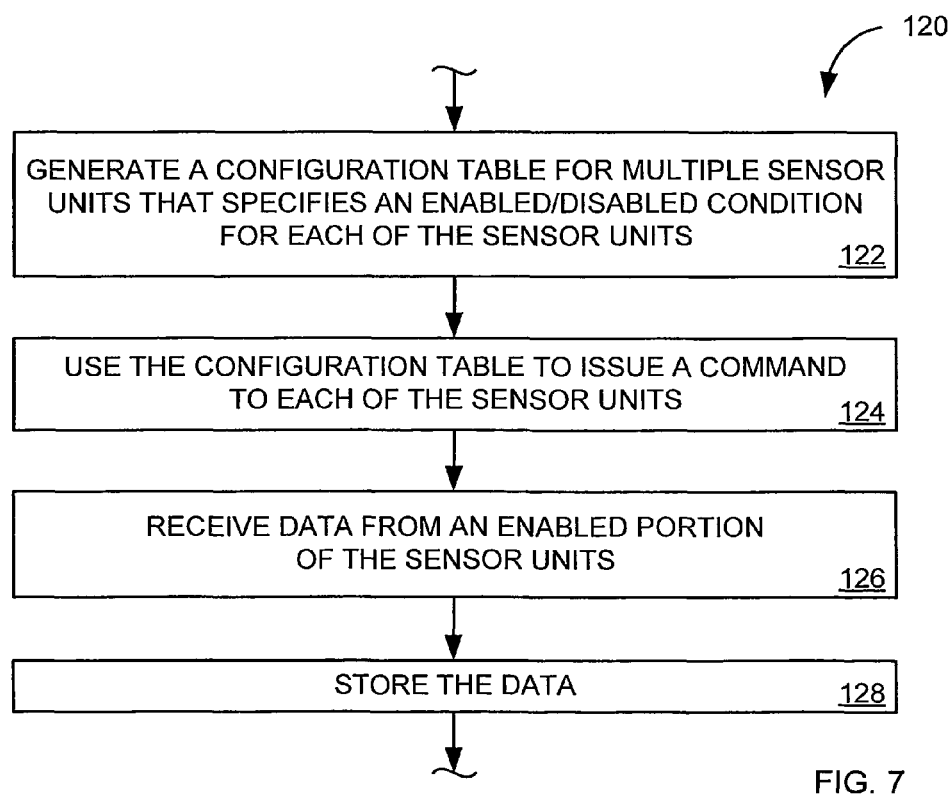
FIG. 6 is a diagram of an illustrative sensor array configuration table.
FIG. 7 is a flowchart of an illustrative method for acquiring data.

Software including processor instructions for carrying out the functions of the data recording and control system 18 may, for example, be retrieved from storage device 102 and temporarily stored in the memory 96 for easy access. The processor(s) 92 may fetch the instructions as needed from the memory 96 and execute the instructions, thus carrying out the functions of the data recording and control system 18. In some embodiments, the data recording and control system 18 executes program instructions to generate a configuration table for the sensor array 22, and to issue commands to enable or disable selected sensor units 50 based on the configuration table. FIG. 6 is a diagram of an illustrative configuration table 110 that specifies an enabled/disabled condition for each of the sensor units 50 in the sensor array 22. The configuration table 110 (or a representation thereof) may be stored in the memory 96.

Illustrative configuration table 110 includes a row for each group control unit in array 22 and a column for each sensor unit in a group. FIG. 6 shows M sensor unit groups, with N sensor units in each group. An 'ON' designation in the configuration table 110 indicates that a corresponding one of the sensor units is to be enabled, and an 'OFF' designation indicates that a corresponding one of the sensor units is to be disabled. The data recording and control system 18 may use the configuration table 110 to send enable or disable commands to each of the sensor units.

In at least some embodiments, each of the sensor units 50 has a unique address, and the data recording and control system 18 issues commands that are directly addressed to the sensor units. In other embodiments, the data recording and control system 18 addresses the commands to the group control units, providing state information for each of the sensor units in the group. The group control units then generate individual commands to the sensor units to put the sensor units in the appropriate state. In either case, the commands received by the sensor control units might include an address field and a control field. The address field would have one or more bits specifying an address of one of the sensor units, and the control field would include at least one bit specifying whether the addressed sensor unit is to be placed in the enabled state or the disabled state.

FIG. 7 is a flowchart of an illustrative method 120 which could be implemented by the data recording and control system 18. During a block 122 of the method, data recording and control system 18 generates a configuration table (e.g., the configuration table 110 of FIG. 6) to specify the state of each sensor unit in the sensor array. The system may employ any one of a variety of methods to generate the configuration table. A random configuration can be obtained, for example, by generating for each of the available sensor units a random number with a uniform probability distribution between zero and one. The random value is compared to a threshold and those values below the threshold indicate that the corresponding sensor unit should be disabled, while values above the threshold indicate that the sensor unit should be enabled. The threshold is set higher or lower to reduce or increase the relative number of enabled sensor units. For example, setting the threshold at 0.75 (when using a uniform distribution between 0 and 1) will result in about 25% of the sensor units being active. In an alternative approach, the number of desired active sensors is first determined, and for each desired active sensor a random number is generated to determine which of the available sensors will serve as that active sensor. In this approach the random number R between 0 and 1 may be multiplied by the number of available sensors N, and the result rounded up to the nearest integer to find the selected sensor, e.g., s=round(R*N+0.5). Where it is desired to improve the performance of the sensor array, the initial random configuration can be evaluated and adjusted in accordance with the procedures outlined by Wen Tang, Jianwei Ma, and Felix J. Herrmann, in "Optimized Compressed Sensing for Curvelet-based Seismic Data Reconstruction", which was previously referenced herein.

In block 124, the system issues commands to enable or disable each of the sensor units in accordance with the configuration table. In block 126, the data recording and control system 18 receives seismic measurement data from the enabled sensor units. As part of this receiving operation, the system may send a trigger signal to the seismic source to fire a shot and a trigger signal to the seismic array to initiate operation of the enabled sensor units. In block 128 the system stores the measured data. The recorded data can then be processed later to reconstruct the seismic signals and perform conventional seismic inversion to obtain information about the subsurface structure in the survey area.

Numerous variations and modifications will become apparent to those skilled in the art once the above disclosure is fully appreciated. For example, if one or more defective sensor units are detected, the system can adjust the configuration table (and with it, the resulting arrangement of enabled sensor units) to avoid using the defective sensor units. Such reconfiguration can, if necessary, be performed in mid-survey. Where accelerometers are used, particle-velocity sensors can be employed instead. It is intended that the following claims be interpreted to embrace all such variations and modifications.

What is claimed is:

1. A seismic survey system, comprising:
    at least one marine seismic streamer, wherein each streamer includes a plurality of spaced apart sensor units, and wherein each of the sensor units is adapted to receive a command and to operate in an enabled state or a disabled state dependent upon the command; and a data recording and control unit that generates a configuration table specifying an enabled/disabled condition for each of the sensor units and, based on the configuration table, issues commands to enable or disable selected sensor units to provide a compressed sensing arrangement of enabled sensor units, wherein the data recording and control unit further collects and stores data from enabled sensor units.

2. The seismic survey system as recited in claim 1, wherein the sensor units produce data when in the enabled state, and do not produce data when in the disabled state.

3. The seismic survey system as recited in claim 1, wherein the sensor units dissipate significantly less electrical power in the disabled state relative to the enabled state.

4. The seismic survey system as recited in claim 1, wherein the data recording and control unit generates the configuration table using random number generation.

5. The seismic survey system of claim 1, wherein the sensor units are uniformly spaced along the streamer, and where the enabled sensor units of the compressed sensing arrangement are not uniformly spaced.

6. The seismic survey system of claim 1, further comprising a ship that tows the at least one streamer through a body of water.

7. The seismic survey system of claim 1, wherein each sensor unit comprises:

at least one sensor adapted to produce an analog output signal indicative of seismic wave energy;

an analog-to-digital converter coupled to receive the analog output signal produced by the at least one sensor, and adapted to periodically sample the analog output signal and to produce a digital data output indicative of the sampled analog output signal; and a control unit coupled to the analog-to-digital converter, and adapted to receive a command and to enable or disable the analog-to-digital converter dependent upon the command, wherein said enabling or disabling is independent of other sensor units in the seismic sensing array.

8. The seismic survey system of claim 7, wherein the seismic sensing array comprises at least one towed marine seismic streamer.

9. The seismic survey system of claim 7, wherein the analog-to-digital converter is disabled by stopping a clock signal.

10. The seismic survey system of claim 7, wherein the control unit is adapted to produce an enable signal dependent upon the command, and wherein the analog-to-digital converter is coupled to receive the enable signal and adapted to sample the analog output signal produced by the at least one sensor and to produce the digital data output dependent upon the enable signal.

11. The seismic survey system of claim 7, wherein the control unit is adapted to provide electrical power to the analog-to-digital converter dependent upon the command.

12. The seismic survey system of claim 7, wherein the at least one sensor comprises a hydrophone.

13. The seismic survey system of claim 7, wherein the at least one sensor comprises a hydrophone and an accelerometer or particle-velocity sensor.

14. The seismic survey system of claim 13, wherein the number of sensing axes for the accelerometer or particle-velocity sensor is between one and three, inclusive.

15. The system of claim 1, wherein the configuration table generated by the data recording and control unit specifies a disabled condition for a majority of the sensor units.

* * * * *